United States Patent [19]

Shell

[11] Patent Number: 4,775,259

[45] Date of Patent: Oct. 4, 1988

[54] CONNECTOR ARRANGEMENT

[75] Inventor: Irving Shell, Pompano Beach, Fla.

[73] Assignee: Benada Aluminum of Florida, Inc., Boca Raton, Fla.

[21] Appl. No.: 129,761

[22] Filed: Dec. 7, 1987

Related U.S. Application Data

[63] Continuation-in-part of Ser. No. 926,952, Nov. 4, 1986, abandoned.

[51] Int. Cl.⁴ .......................... B25G 3/00; F16B 9/00
[52] U.S. Cl. .................................... 403/252; 403/187; 403/348
[58] Field of Search ............... 403/187, 252, 263, 255, 403/254, 348

[56] References Cited

U.S. PATENT DOCUMENTS

| | | | |
|---|---|---|---|
| 892,021 | 6/1908 | Wirsching | 403/252 |
| 2,657,894 | 11/1953 | Sklenar | 403/252 X |
| 3,338,602 | 8/1967 | Arnd | 403/252 |
| 3,451,158 | 6/1969 | Fischer | 403/263 X |
| 3,749,432 | 7/1973 | Janssen | 403/348 X |
| 4,556,337 | 12/1985 | Marshall | 403/255 |

Primary Examiner—Andrew V. Kundrat
Attorney, Agent, or Firm—Richard M. Saccocio

[57] ABSTRACT

A connector arrangement for butt joining substantially hollow, tubular structural members is provided comprising a connector which is securely fastened within the end of a first member to be abutted to an extending member and whereby the head of the connector protrudes from the first member and is simultaneously and securely retained within two openings provided within the extending member. In a preferred embodiment, the two openings in the extending member extend the full length of the extending member along each side face thereof. In this manner, the joint may be effectuated at any location along the length of the extending member. The head configuration of the connector includes a spherical portion and a plate portion, which provide for a secured fit within the two openings of the extending member.

6 Claims, 4 Drawing Sheets

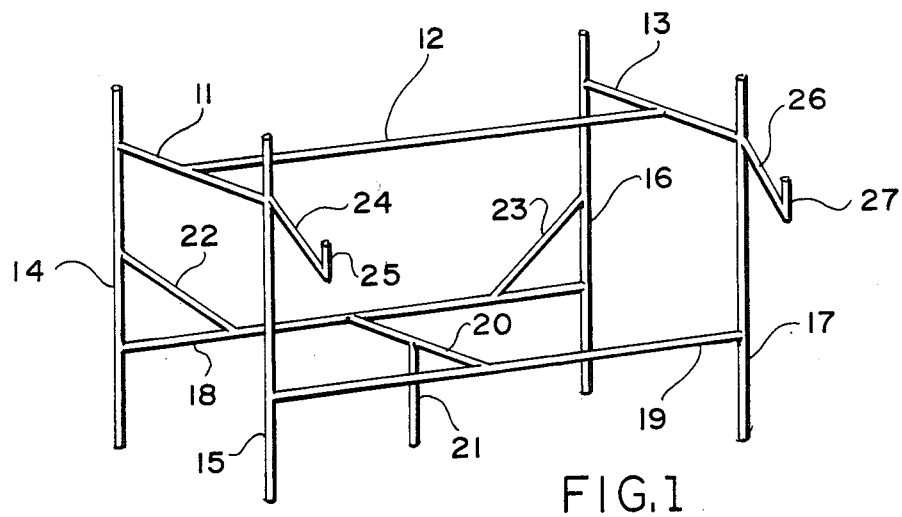
FIG.1
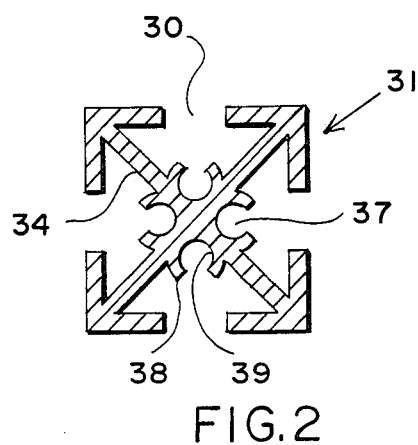
FIG.2
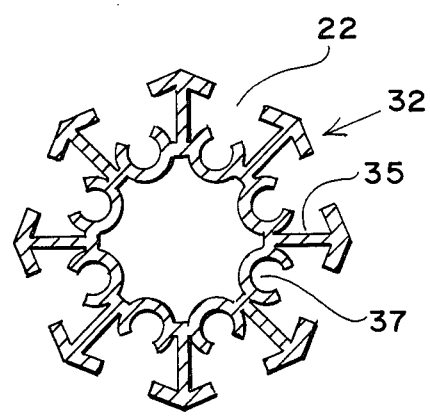
FIG.3
FIG.6A   FIG.4
FIG.7A
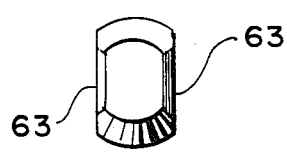
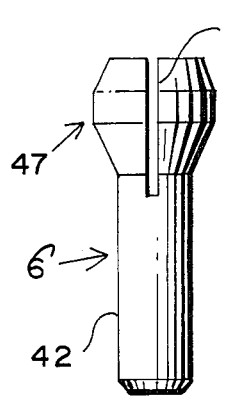
FIG.6
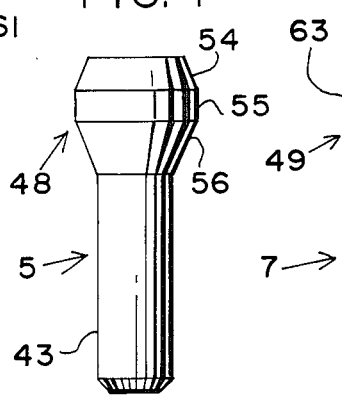
FIG.5
FIG.7
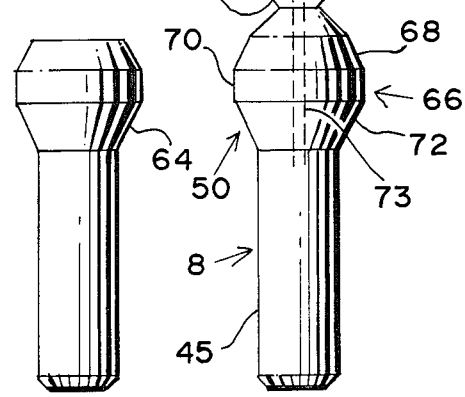
FIG.7B   FIG.8

CONNECTOR ARRANGEMENT

CROSS REVERENCE TO RELATED APPLICATIONS

This application is a continuation-in-part of prior U.S. patent application Ser. No. 926,952, filed Nov. 4, 1986, entitled Connector Arrangement, by Irving Shell, and now abandoned.

BACKGROUND OF THE INVENTION

1. Field of the Invention

The present invention relates in general to the field of connectors for structural assemblies and in particular to the field of connector arrangements for angled connection of structural extruded shapes for use with storage racks, display racks, shelving systems, and other such structural arrangements.

2. Description of the Prior Art

The prior art is replete with various examples of angled connectors and arrangements whereby upright members are joined with horizontal members. Such angled connections, which may have butt or mitered joints, are required in various sundry fields. For example, the connection of ladder rungs to the side rails, horizontal braces connecting the legs of a table or a chair, cross-braces of the triangulated frames of bicycles and motorcycles, scaffolding cross-braces, cross- and horizontal braces for display rack systems, and other like structural arrangements. The type of angled connections used in such examples depends upon the angle between the components as well as the end use of such structural arrangements, that is, whether it is structural or decorative. Another factor involved is the type of material from which the arrangement are made. Thus, where solid components made from wood are to be joined, the connection may comprise gluing, nailing, or screws. For permanently assembled metal components, welding may be utilized, or if the metal components are substantially solid, bolts may be used to fasten together the angled components. However, where the components to be fastened together comprise hollow extruded or welded components and where the included angle is obtuse, right, or acute and where the completed assembly is required to be structural sound and support a reasonable load and possess an aesthetically clean appearing joint, the common well-known fastening techniques and arrangements are generally not applicable. Also, if the size of the completed structural arrangement and the location of the cross members is not fixed or standard, the use of commonly known fastening techniques is further deemed inappropriate.

In the prior art, the method most commonly used to fasten two generally hollow tubular members ar angles to each other involves either an unpleasantly looking screw connection or a friction or locking connection where the use of a connector assembly is placed within one of the components, and where the connector usually includes a protruding end piece which interlockingly engages with a hole or other aperture within the other component. One example of such a connector assembly is shown and described in my U.S. Pat. No. 4,142,809, entitled "Connector Assembly," issued Mar. 6, 1979. In this patent, I utilized a cylindrical connector in one component having an axially extending projection at one end with a square neck and a circular head which respectively mate with the neck and head portion of a keyhole aperture provided in the other component. The connector is retained within one of the components by means of deforming the tubular member within a circular groove around the periphery of the connector or by using a set screw to connect the tubular member to the connector. While such connector assembly is no doubt useful and is a substantial contribution to the art, it, like other apparatus of the prior art, has certain limitations which tend to limit the usefulness of the arrangement because of inconveniences associated with the connector assembly and the inconveniences of having to prepare special openings in the extending member at the exact location of the joint.

In the field of display rack arrangements, there are very few instances when two racks are of the same size and have cross horizontal members and vertical column members at the same locations. The prior art friction or locking connector assemblies or the screw connection assemblies do not generally provide for simplicity and convenience that would advantageously facilitate building such arrangements. For example, it is inconvenient and costly to engage skilled personnel to build the highly esoteric racks used for display arrangements. When a rack of particular size and shape is required, it is expensive and time consuming to have to prepare detailed drawings of the system, buy the raw materials, and then hire a skilled worker to complete the assembly. It is much more desirous to be able to go to the warehouse of a metals distributor, give him the size of the components needed, have him cut the same to such sizes, bring the components to the location of the display rack, and simply assemble the same on location. To be able to effectuate a simple, convenient, time-saving and cost effective method of constructing display racks, new and improved connector assemblies not present in the prior art are required.

Accordingly, it is an object of the present invention to provide a connector arrangement for use with extruded or fabricated, generally hollow tubular members which permits angled joining of the components using little or no tools and yet results in a structurally strong and aesthetically pleasing arrangement.

Yet another object of the present invention is to provide a connector arrangement whereby a nonskilled worker can join together at any angle various components at the location where the arrangement is to be used.

Another object of the present invention is to provide a connector arrangement which does not require special preparation of either of the components to be joined at any angle relative to each other and yet results in the structurally sound and strong connection.

Another object of the present invention is to provide a connector arrangement whereby the location of the horizontal members in the completed unit is infinitely adjustable relative to the upright members.

Another object of the present invention is to provide a connector arrangement whereby an assembled display rack arrangement may be disassembled without the need for tools and does not involve structural damage to any of the components and which allows the components to be reused at a later date.

The above-stated objects as well as other objects which although not specifically stated, but are intended to be included within the scope of the present invention, are accomplished by the present invention.

SUMMARY OF THE INVENTION

The present invention overcomes the problems of the prior art by providing a connector arrangement for joining together generally hollow tubular structural members thereby forming a structure which may be used for display rack purposes, shelving, or the like.

A predominant feature of the present invention provides for butt joining of generally hollow tubular members at any angle between the members by press or snap fitting the butt end of the angled member into the extending member at any desired position along the extending member. The tubular members are provided with a longitudinal slot extending the entire length thereof along each flat face of the tubular member. A second linearly extending slot is provided interiorly of the face slot and is spaced therefrom by a predetermined distance. The width of the interior slot is slightly less than that of the face slot. The interior slot, comprises the opening of a geometric feature which in cross-section, has a generally round or circular configuration. A fastening connector having a cylindrical shank is press fitted within the circular portion of the interior slot at the butt or cut off end of the angled member. A specially-shaped head extends from the shank of the fastener and simultaneously from the butt end of the angled member. In one embodiment the shape of the head of the fastener is such that it may be press fitted within the first longitudinally-extending slot and within the slot forming the opening within the interior of the extending hollow tubular member. Depending upon the shape of the tubular members which are to be joined, one or more of the fastening connectors may be inserted within the butt end of the angled member and thereby provide a more secure angled connection between the two members.

In another embodiment the head of the fastening connector is compressible in order to facilitate assembly and disassembly and yet provide a firm connection. A further embodiment of the head of the fastener provides tighter connections by a wedging arrangement where either the angled member and the connector are rotated relative to the extending member or the connection is rotated relative to both members in order to effectuate a wedged connection between the two components.

In a further embodiment the body or shank of the fastening connector is provided with spaced protrusions along one side of the shank which after being inserted in the interior slot of one extending member and rotated, mechanically locks the connector within the interior slot. The head of the fastening connector is specifically configured to simultaneously lock into the interior slot and the face slot of the connecting extending member when the connector is rotated approximately 90°. Moreover, in this embodiment, it is not necessary to first lock the connector in the first extending member; this mechanical locking and the locking to the second extending member may be simultaneously accomplished by a single rotating action.

By appropriate modifications along with the provision of special adapters, the inventive arrangement may be applied to hollow, tubular members without a longitudinally-extending face slot and without a circular geometric portion within the interior of the tubular member.

Another predominant feature of the present invention provides for mitered joining of the ends of two longitudinally extending members by the use of a connector which provides a press or snap fit between the two members wherein the circular opening of both members are used.

The present invention thereby provides a connector arrangement for generally hollow, tubular members which allows for on-sight assembly with a minimum of tools. Additionally, there is provided a butt-connector arrangement or mitered angle connector arrangement which allows for the fabrication of a display rack or the like having virtually any desired shape or size, which only requires cutting the angled and the extending members to a desired or predetermined length. This latter aspect is particularly significant in that the desired lengths of the tubular members may be cut by the warehouseman who stocks the tubular members. The arrangement also provides a design freedom which neither requires engineering services nor skilled worker services in order to design and erect the desired structures.

Various other objects, advantages and features of the invention will become apparent to those skilled in the art from the following discussion taken in conjunction with the following drawings, in which:

BRIEF DESCRIPTION OF THE DRAWINGS

FIG. 1 illustrates one design of a typically complicated display rack arrangement which may be assembled employing the connector arrangements of the present invention;

FIG. 2 is a cross-sectional view of one type of extruded structural member which may be used with one of the various types of fastening connectors in order to effectuate a butt-joint or mitered angle connection as provided by the present invention;

FIG. 3 is a cross-sectional shape of another type of extruded structural member which may be used with the present invention;

FIG. 4 is a plan view of a preferred embodiment of a connector as provided by the present invention which may be used to join generally hollow, tubular structural members;

FIG. 5 is a plan view of another embodiment of a fastener connector according to the present invention which may be used to join generally hollow, tubular structural members;

FIGS. 6 and 6A views of another embodiment of a fastener connector as provided by the present invention;

FIGS. 7, 7A, and 7B are plan, top and side views, which depict another embodiment of a fastener connector according to the present invention;

FIG. 8 shows in plan view another embodiment of a fastener connector as provided by the present invention;

FIGS. 9 and 9A show a plan view and a side view, respectively, of another embodiment of the fastener connector of FIG. 8 as provided by the present invention;

FIG. 10 illustrates in plan view the shank portion of a typical fastening connector having threaded means thereon for connecting the fastener to one of the structural members;

FIGS. 11 and 11A illustrate a fluted shank of a typical fastener as provided by the present invention;

DESCRIPTION OF THE PREFERRED EMBODIMENTS

Figures 9, 9A, 10, 10A, 11:
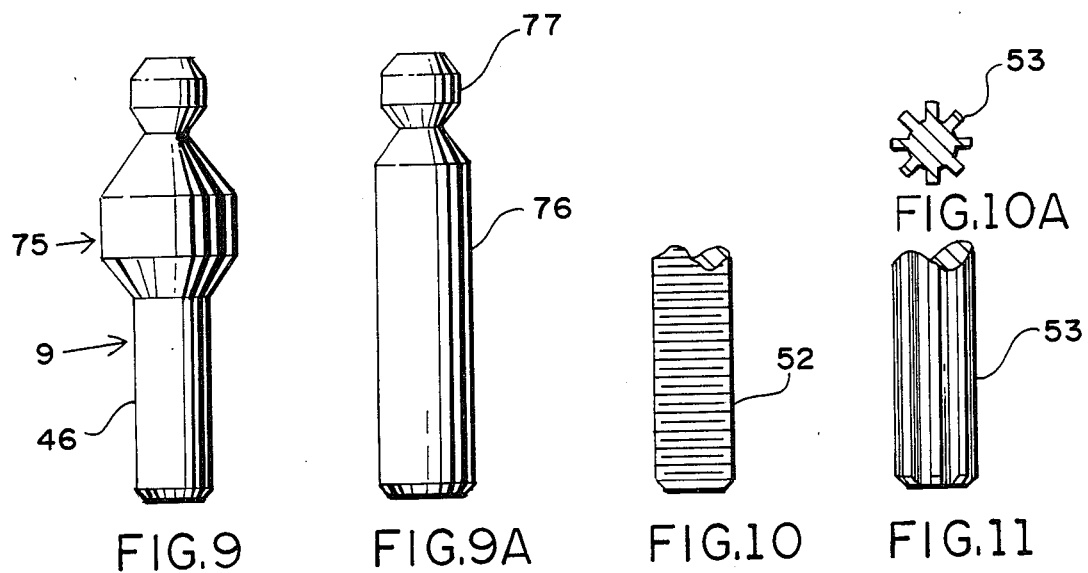

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings wherein like characteristics and features of the present invention shown in the various figures are, in general, designated by the same reference numerals.

FIG. 1 illustrates a typical structural arrangement which may comprise the framework for a display rack. The various connections of the horizontally- and vertically-extending members, and the angled member comprise the joints to which the connector arrangement of the present invention applies. FIG. 1 is seen to be a free-standing unit which allows for the use of a shelf across members 11, 12 and 13. These members are supported by four vertical columns 14, 15, 16, and 17 which are braced by horizontal members 18 and 19. Further support for the structure is provided by brace member 20 and leg member 21, and angled brace members 22 and 23. In addition, mitered angled members 24 and 25 and 26 and 27 provide for an angled shelf there across. It is to be especially noted that the present invention is not limited to the structure shown in FIG. 1. Any structure utilizing support and brace members made from substantially hollow, tubular members having angled connections may be easily and conveniently fabricated by employing the connector arrangement of the present invention.

Figures 12, 13:
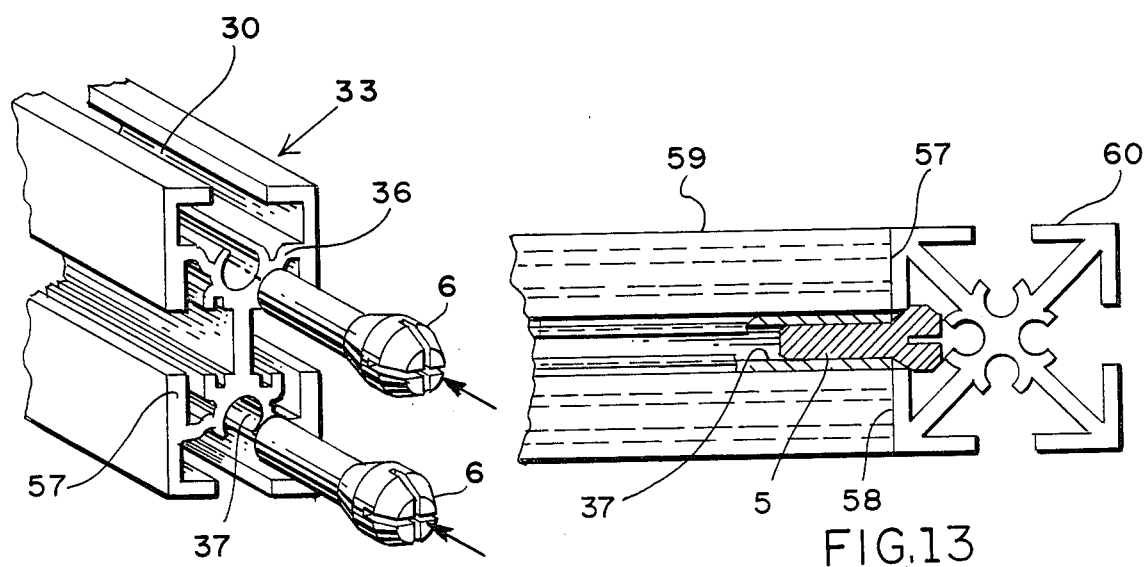
FIG. 12 is a perspective view of another type of an extruded structural member illustrating the use of two fastener connectors as provided by the present invention.
FIG. 13 is a plan, partially cross-sectioned view of a completed butt connection as provided by the present invention.

FIGS. 2, 3, and 12 depict in cross-section some of the typical shapes of the substantially hollow structural members which may be joined together by the connector arrangement of the present invention. The shapes shown in FIGS. 2, 3, and 12 are particularly applicable for use with the connector arrangement of the present invention in that various features of the same, as further explained below, provide for use of a fastener connector without modification to the tubular members. However, any substantially hollow, tubular member may be used with the present invention by utilizing a different embodiment of the connector in conjunction with preparation of the tubular members for accepting the connector arrangement.

It is contemplated that the various shapes of the tubular members which may be employed with the connector of the present invention are fabricated by an extrusion process and are made from a metal such as aluminum. Extruded shapes have the advantage of conformity in the dimensions of the various characteristics of the shape as well as allow for long lengths which may be conveniently cut to a desired size or angle. By making the tubular members from aluminum, easy handling obtains due to the lightness of the material and aluminum allows for easy cutting of the members to the lengths desired. Again, however, the connector arrangement of the present invention is not limited to extruded shapes made from aluminum.

In FIGS. 2, 3, and 12, it is seen that a slot or opening 30 is provided on each flat face of tubular members 31, 32 and 33. Opening 30 extends the full length of the tubular members. Structural rigidity is provided by ribs 34, 35, and 36 which ribs extend from the side faces of the tubular members to the center portion thereof. Each center portion includes at least one opening 37 having a generally semi-circular, crosssectional shape as shown in the drawings. In member 31, four such openings 37 are provided; in member 32, eight openings 37 are provided; and, in member 33, two openings 37 are provided. Openings 37 may be seen to be located internal of the tubular structural members in alignment with openings 30. Openings 37 also extend the full length of the length of the structural members. Openings 37 include an entrance portion 38 and a substantially semi-cylindrical bore portion 39. As shown in the drawings, openings 37 are slightly more circular than a true semi-circle. A preferred configuration for opening 37 would be approximately two-thirds of a circle which approximate a "C" shape.

FIG. 4 illustrates a connector 4 according to the present invention having a head configuration which is substantially spherical.

Figure 14:
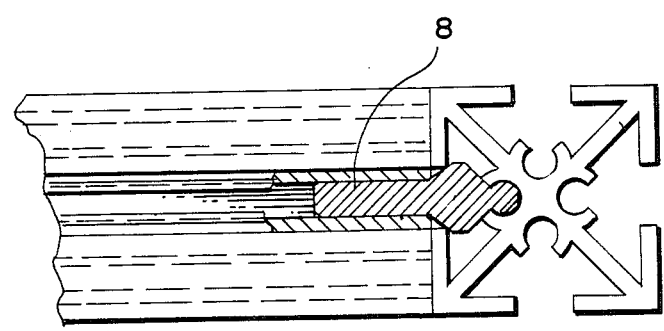
FIG. 14 is a plan, partially cross-sectioned, view illustrating a double connection provided by a double headed type of fastener.

FIGS. 5 through 9 illustrate a number of different connector configurations which may be used to effectuate the angled connections provided by the inventive connector arrangement. Each connector includes a shank portion and a head portion. The heads of the connectors differ from that of the preferred embodiment of FIG. 4 in that they depict head configurations which although are generally spherical, are shaped to allow for ease of machining. Thus, connectors 5, 6, 7, 8, and 9 include shanks 42, 43, 44, 45 and 46 and heads 47, 48, 49, 50, and 51, respectively. The shank portions of the various connectors are adapted to fit longitudinally within openings 37 with the head portions protruding from or extending out from the end of the tubular member as shown in FIGS. 13 and 14.

In one embodiment and as shown in FIGS. 5 through 9, the shanks of the various connectors comprise a smooth, cylindrical shape, which are dimensioned to provide a slight-to-medium press fit within openings 37. A chamfer or slight taper may be provided at the end of the shank portions to facilitate initial entry into openings 37. A slight to a mild force fit would then only require a slight tapping force on the head of the connectors to firmly seat the same within openings 37.

Additional means used to secure the various connectors within openings 37 are shown in FIGS. 10 and 11. In these figures the shanks include self-tapping threads 52 and axial flutes 53, respectively. Thus, if a more secure than a press fit is desired, the connector may be screwed into opening 37 utilizing self-cutting threads 52. Should the connection between the connectors and the openings 37 be of a type where prevention of rotation is desirous, the fluted shank design 53 may be utilized. In the fluted embodiment, the overall cross-sectional diameter of the shank should be slightly greater than the internal diameter of cylindrical portion 39 of openings 37 such that the flutes cut slightly into the cylindrical portion 39 when the connector is being inserted within openings 37. The entrance end of flutes 53 may be sharp in order to facilitate the cutting action when the connector having a fluted shank is force fit into openings 37.

The head portion 48 of the connector shown in FIG. 5 is the simplest embodiment of the head portion of the connector as provided by the present invention and comprises a substantially truncated spherical shape. The free end of the head portion 48 may comprise, for ease of machining, a truncated, cylindrical cone 54, the base of which meets with a cylindrical center portion 55. The transition between cylindrical portion 55 and shank 43 may comprise, for ease of machining, another truncated conical portion 56 which extends down from cylindrical portion 55 and joins with shank portion 43. The overall cross-sectional diameter of cylindrical portion 55 is very slightly larger than the width of opening 30. The diameter of the entrance end of conical portion 54 and the diameter of the shank end of conical portion 56 smaller than the diameter of cylindrical portion 55 and smaller than the width of openings 30. The smaller entrance end of portion 54 allows for convenience of positioning the connectors of FIG. 5 into an opening 30 at a desired entrance point along the length of an appropriate tubular member prior to making the connection. The slight difference in diameter between cylindrical portion 55 and the width of opening 30 requires that a slight amount of force be used to push the head portion 48 of the connector through the width of opening 30. Since a cylindrical shape may be provided to portion 55 of head 48, only a small amount of interference exists between the cylindrical portion 55 and slot 30. Stated differently, the interference exists only for a relatively small number of degrees around the circumference of cylindrical portion 55 and along a very along length of the straight edges of opening 30 and, therefore, only a slight amount of force is required to insert head 48 into opening 30. The head of the connector shown in FIG. 5 is then further pushed into and through opening 30 until such time as the cut off end 57 (FIG. 13) into which one or more connectors have been inserted is flush up against the side face 58 of the tubular member to which the butt joint is being made as shown in FIG. 13. When the cut off end 57 and the side face 58 are flush with each other, the cylindrical portion 55 of the head of the connector is completely through the opening 30 and the conical portion 56 is in contact with the inner edges of opening 30. Since the point at which the cylindrical portion 55 enters opening 30 has been slightly deformed as a result of the interference fit, and in order to ensure a tight joint, it may be preferable (but is not essential) that when making the connection using a connector having a solid head as depicted in FIG. 5 that the entrance point into opening 30 is positioned slightly above or below the final in place position of the abutting members. In other words, when making the butt connection, the head of the solid connector may be initially positioned a slight distance, for example, an eighth to a quarter of an inch away from the desired location of the butt connection. And then, after the head of the connector is forced within opening 30, the member 59 containing the connector may be tapped slightly in a direction along the length of opening 30 to achieve movement of member 59 by the amount between, the one-eighth of an inch to one-quarter of an inch, to the desired location of member 59 relative to the length of member 60. In this manner any deformity caused by the interference fit would not effect the strength of the connection.

FIG. 6 illustrates another embodiment of the connector configuration wherein one or more slots 61 are provided in the head portion 47 (which is also substantially spherical) of the connector and which extend down into the shank portion 42 thereof. In the embodiment shown in FIG. 6, two slots 61 are used, each at right angles to each other. Slots 61 provide the head portion 47 with a slight degree of compressibility which may be used during insertion of the head portion 47 into opening 30 and for additional retention force of the head 47 within opening 30 when fully inserted therein.

Slots 61 divide the head 47 and a portion of the shank 42 into four segments which are cantilever supported to shank 42. This cantilever support provides for the aforementioned ability of head portion 47 to compress slightly in its cross-sectional diametrical configuration during insertion of the head 47 into an opening 30. Thereafter, once head 47 is fully inserted within an opening 30, the resiliency of the segments due to the elastic bending of each of the four segments of head 47 reacts against the inner edges of opening 30 and thereby provides a springloaded fit of head 47 within opening 30. In this embodiment, little or no enlarging of the opening 30 is caused by the head of the connector entering the opening and, therefore, the abutting member 59 may initially be precisely located at a desired and final location. The number of slots 61 used and the size thereof may be varied depending upon the connector material, the tubular member material, as well as the amount of interference desired between the head of the connector and the slotted opening 30 in the tubular member. Obviously, many variations are thereby provided by this embodiment, all of which are contemplated to be within the scope of this invention.

Another embodiment of the connector provided by the present invention is shown in FIGS. 7, 7A, and 7B. The side shape of the connector including the head portion 49, shown in FIG. 7B, is seen to be the same (substantially spherical) as that shown in FIG. 5. However, at right angles thereto, as shown in FIGS. 7 and 7A, head 49 is provided with flat sides 63 so as to result in a across- the-flats dimension of head 49 which is somewhat smaller that the width of slotted opening 30.

In effectuating a butt connection of a member 59 within another member 60 using the connector shown in FIG. 7, the connector is inserted within circular opening 37 such that the flat sides 63 are positioned offset to the longitudinal axis of opening 30. In effectuating the butt connection shown in FIG. 13, the flat surfaces of the connector shown in FIG. 7 are fitted through and within opening 30. End 57 of member 59 is then fitted flush up against side 58 of member 60. Then, member 59 and the connector are twisted in an appropriate direction to force fit the tapered portion 64 within opening 30 and such that the sides of member 59 are aligned with the sides of member 60. Once the connection is made and should it be determined that a further force fit and, therefore, strength of the butted connection is required, members 59 and 60 may be disconnected, and more offset of the flat sides 63 of the connector is made relative to the axis of slotted opening 30. Then the two components may be reassembled as stated above and whereby additional twisting force is required to properly align the abutting members 59 and 60. The additional twisting force results in a greater force fit between tapered portion 64 of the connector and the edges of opening 30 which, of course, results in a joint of greater strength and tightness.

Yet another embodiment of the connector provided for by this invention is shown in FIG. 8 of the drawings. In this embodiment the head 50 of the connector comprises two distinct but connected portions 65 and 66 each of which are substantially spherical but for ease of machining may include tapered entrance ends 67 and 68, cylindrical center portions 69 and 70, and reverse tapered portions 71 and 72. The resulting abutting connection made with the use of the connector of FIG. 8 is shown in FIG. 14. In this connection arrangement, head portion 65 is force fit and retained within opening 37 and head portion 66 is force fit and retained within opening 30. In this manner a double force fit connection is effectuated. The head of the connector 8 shown in FIG. 8 may be solid similar to the connector 5 shown in FIG. 5, or may be slotted similar to the head of the connector 6 shown in FIG. 6. In this regard the slots 73 are shown in phantom in the embodiment of FIG. 8.

The connector 9 shown in FIGS. 9 and 9A comprise another variation of the connector as provided by the present invention. In these figures it is seen that connector 9 is a combination of connectors 8 and 7. The head 75 comprises a wedging portion 76 and a force-fit portion 77. Wedging portion 76 functions similar to the wedging head 49 of the connector 7 shown in FIG. 7, while force-fit head portion 77 functions in a manner similar to the force-fit head portion 65 of the connector 8 of FIG. 8. In utilizing a connector 9 as shown in FIG. 9 in a butt joint connection similar to that shown in FIG. 14, the connector 9 is inserted within the opening 37 of the abutting member as with the connector embodiment shown in FIG. 7. Then, the head portion 77 is force fit within the opening 37 of the extending member to initially secure the two members to each other. The abutting member is then rotated thereby causing the wedging portion 76 of the connector 9 into a tight connection with the opening 30 of the extending member. This embodiment allows for the double-headed connection with the initial connection being somewhat loose in order to initially secure the two components to each other, then, if the location is correct, the final firm connection using the wedging portion 76 may be made to complete the joint.

It is to be noted that the shank portions 42, 43, 44, 45, and 46 of the embodiments of FIGS. 5, 6, 7, 8, and 9 may be provided with either a smooth, cylindrical surface, a threaded surface or a fluted surface. Additional, if more than one connector is to be utilized to connect one tubular member with another such as that shown in FIG. 12, any combination of the connectors and shank configurations shown in FIGS. 5 through 11 may be utilized.

It is to be noted that the connector arrangement provided by the present invention between two substantially hollow, tubular members may be easily disconnected by using a procedure in reverse to that stated above. Once disassembled, the abutting parts may be reconnected at the same or different locations as desired. Since slotted openings 30 as well as circular openings 37 are provided along the entire length of the tubular members, the butt joint may be made at any location therealong. In this manner, the finished structural assembly shown in FIG. 1 may assume a configuration whereby members 11, 12, and 13 are positioned along any location relative to vertical members 14 through 17. Similarly, members 20 and 21 may be positioned at any location along member 18 and 19.

FIGS. 15 through 23 illustrate yet another embodiment of the present invention.

Figure 17:
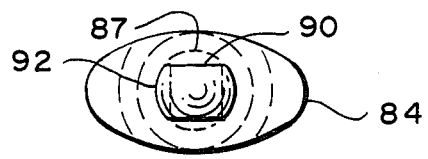
FIG. 17 is a top view of the fastener connector of FIG. 15.
Figures 15, 16:
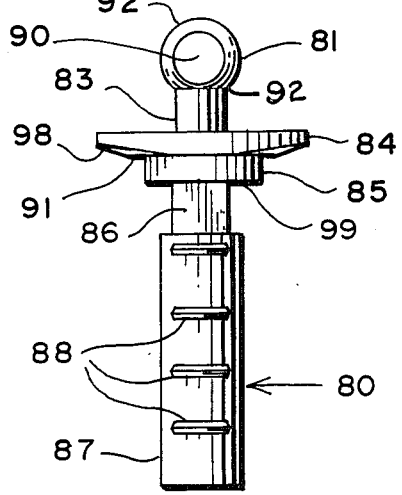
FIG. 15 is a plan elevational view of another embodiment of the fastener connector.
FIG. 16 is a side view of the fastener connector of FIG. 15.
Figure 18:
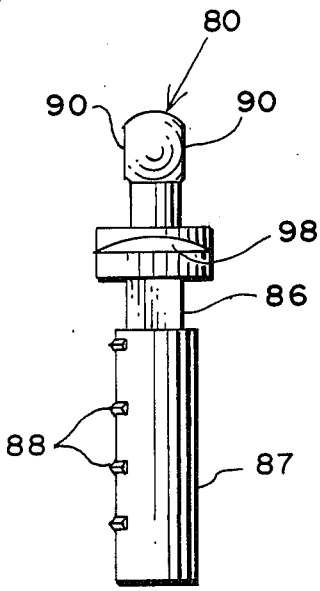
FIG. 18 is a plan, partially cross-sectioned view of a completed butt connection as provided by the connector of FIG. 15.
Figure 20:
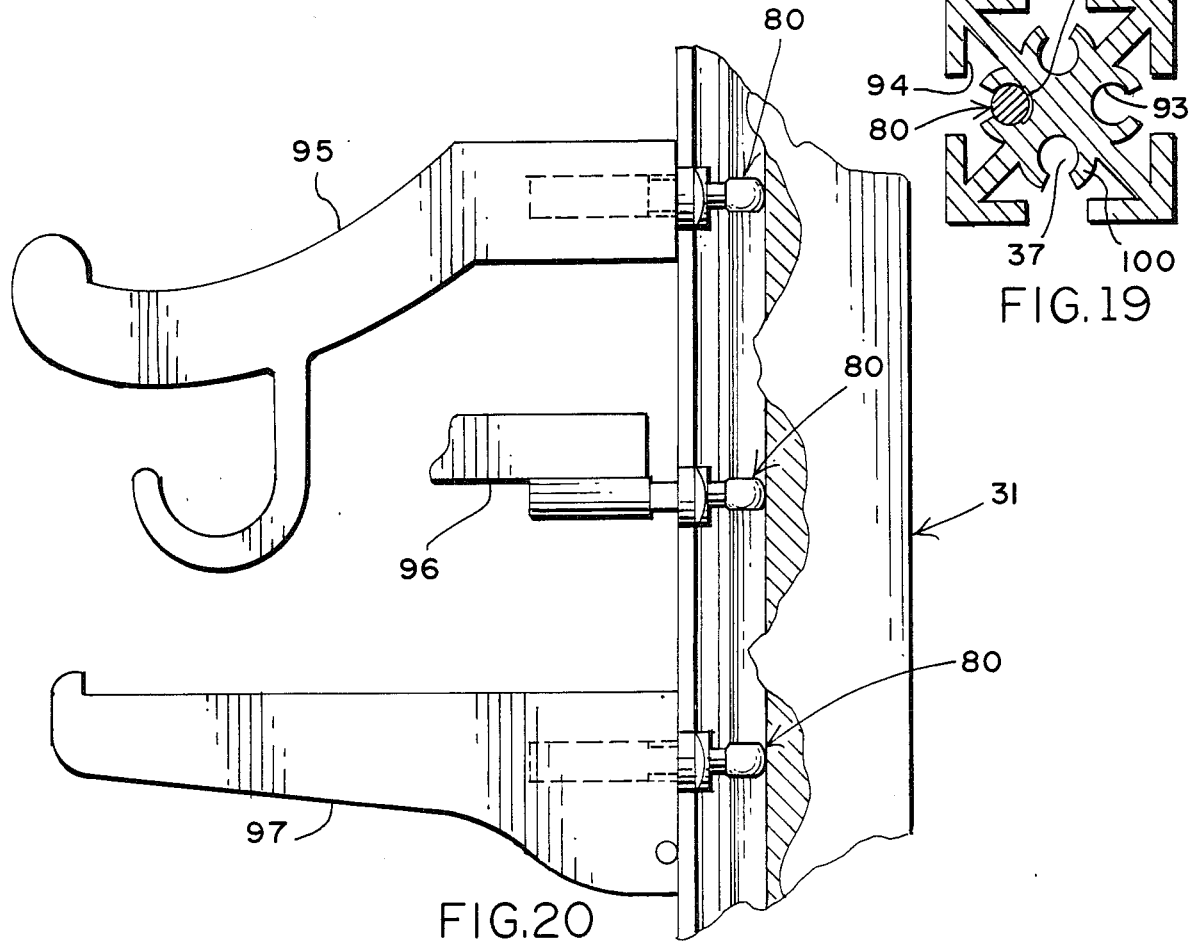
FIG. 20 is a side view, partially in cross section of the same of the various alternative bracket and shelf arrangements capable of being used with the connector of FIG. 15.

The unique design of the head portion 81, flange portion 84, and shank portion 87 of connector 80 shown in FIGS. 15–17 in conjunction with the design of the face slot 30 and inner slot 37 of extending members such as 59 and 31 provide for a firm butt connector between the two extending members as shown in FIG. 18. The same unique connector 80 design and slot designs 30 and 37 may also provide for a bracket or shelf connector to an extending member as shown in FIG. 20.

Connector 80 is intended to join together two other members. Hence, connector 80 must be connected to each of the to-be-joined other members. The shank portion 87 comprises means to join the connector 80 to one member; the head 81 and flange 84 portions comprise the means to join the connector 80 to the other member. Each joinder means will be separately described to facilitate a fuller understanding of the invention. However, it is to be noted that although a first joinder of the shank 87 of the connector 80 to a first member 59 may be effectuated which may then be followed by a second joinder of the first member 59 and the connector 80 to a second member 31, such separate procedures are not mandatory. The invention allows for joinder of the connector 80 simultaneously to both of the to-be-joined members 59 and 31. The latter method will also be described.

Connector 80 is shown in FIGS. 15, 16, and 17. In this embodiment the connector 80 comprises a head portion 81, a cylindrical neck portion 83, a flange member 84, a second cylindrical portion 85, a square portion 86 and a cylindrical shank portion 87. The relative sizes of the cylindrical portions are shown in the drawing with portion 83 having the smallest diameter, then the next larger being portion 87 and the largest being portion 84.

The shank portion 87 of connector 80 comprises an elongated cylindrical member having a plurality of raised ridges or protrusions 88 located along one side thereof and spaced from each other along the axial length of shank portion 87. Each protrusion 88 may have a crescent-shaped configuration being flush at the ends thereof and rising to its maximum height at the center thereof; or, they may have a configuration of a selftapping screw thread. In either case the protrusion 88 extends only partially around the circumference of shank 87. The maximum circumferential length of protrusions 88 must be less than the circumferential length of the entrance or open portion of circular slot 37 extending the length of the extending members 59 and 31. The diameter of shank portion 87 is slightly smaller than the diameter of circular slot 37. The effective diameter of the shank portion at the location of each of the protrusions 88 when measured from the height of a protrusion 88 to the opposite side of the shank 87 is slightly larger then the diameter of circular slot 37.

The relative sizes and shapes of shank portion 37, protrusions 88 and circular slot 37 allow the shank 37 of a connector 80 to be inserted axially into a slot 37 at the end of an extending member provided the ridged protrusions 88 are aligned with the longitudinal entrance or opening of slot 37. The smaller shank diameter allows such insertion while the larger circumferential length of the longitudinal entrance to slot 30 provides clearance for protrusions 88. Connector 88 is inserted in slot 37 such that surface 99 under cylindrical portion 85 is in contact with the end face 100 of slot 37 and hence is in alignment with the end face 101 of member 59.

Figure 19:
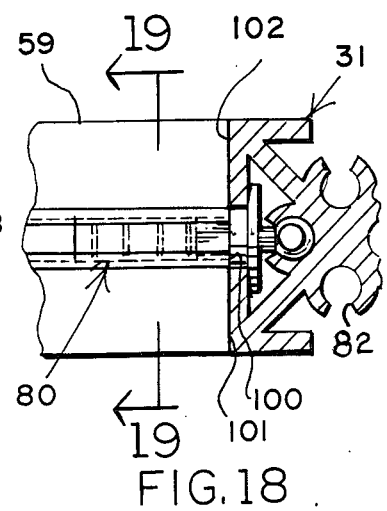
FIG. 19 is a cross-sectional view of the shank attachment of the connector of FIG. 15 to the internal slot of an extending member.

Connector 80 is then rotated in either direction which causes the protruding ridges 88 to cut into the inner circumference 93 of circular slots 37. When approximately 90° of rotation is effectuated as shown in FIG. 19, a maximum amount of bite occurs and connector 80 is firmly mechanically locked in slot 37 of extending member 31. If a separate procedure is used to lock connector 80 in slot 37, the rotation may be accomplished by gripping the flange member 84 with a pair of pliers or a wrench and rotating the same.

As seen in FIGS. 15, 16, and 17, spherical head portion 81 incudes a pair of flat surfaces 90 on opposite sides thereof which lay in planes parallel to the longest side of the rectangularly-shaped flange 84. Also, that protrusions 88 lie generally in these same planes. This thin profile of connector 80 allows the head and flange to enter the openings to slots 30 and 37. Thus, when connector 80 is inserted in slot 37 and rotated 90°, the spherical portion of head 81 and the longest side of flange 84 wedgingly fit within slots 30 and 37 as shown in FIG. 18. This orientation allows for a right angled butt joint between members 59 and 31 and with their side faces aligned with each other and along parallel planes.

Once a connector 80 is locked into extending member 59, it is necessary to connect connector 80 to extending member 31. Both the spherical head portion 81 and the rectangular flange member 84 operate to make the connection to extending member 31. The width of the head portion 81 across flats 90 and the shorter side of flange member 84 are slightly smaller than the opening to slot 37 and the opening of slot 30, respectively. The smaller dimensions allow head 81 to enter into circular slot 37 and allow flange 84 to pass through the opening to slot 30. By rotating extending member 31 while holding member 59 and its attached connector steady (or vice versa), the spherical portion of head portion 81 will wedge within circular slot 37 and surface 91 of flange 84 will wedge against surfaces 84 behind face slot 30. When approximately 90° of rotation has been attained, both extending members will be firmly locked together, at right angles to each other and along a same plane.

In order that both the spherical head portion 81 and flange member 84 operate to make the connection of members 59 and 31, the axial dimension of head portion 81 relative to flange member must be consistent with the dimensional orientation of slot 37 to slot 30. Still referring to FIGS. 15 through 19, the axial distance between surface 91 of flange 84 and the top 92 of head portion 81 is made to be slightly greater than the axial distance between the inner surface 94 of face slot 30 and the innermost point 93 of slot 37. In this manner when the head portion 81 and flange 84 are fitted within and rotated relative to slots 30 and 37, the bottom surface 91 of flange 84 and the top edge 92 of head 81 wedges between innermost point 93 and surface 94 of slots 37 and 30, respectively. The slightly curved or rounded edges 98 of bottom surface 91 and the curved spherical surface of head portion 81 serve to progressively increase the amount of wedging accomplished by the relative rotation above described.

As stated above, the connected of connector 80 to extending member 59 and to extending member 31 may be effectuated using a single procedure. The connector 80 is inserted in circular slot 37 in member 59. The protruding ridges permit only one orientation. Then, the head 81 and flange 84 are inserted in slots 37 and 30, respectively, with member 59 at a right angle to member 31. Then, members 59 and 31 are rotated relative to each other and such that the side faces of each member are parallel. The rotating action will simultaneously cause the protruding ridges 88 on connector 80 to wedge within slot 37 and will cause the wedging of head 81 and flange 84 in slots 37 and 30. With either procedure an extremely firm right angles butt joint is effectuated.

In order to break the joint between extending members 59 and 31 or to move member 59 to a different axial location on member 31, a rotation procedure opposite to that described above is used. Then, the members may be repositioned as desired and locked together using the connecting rotating sequence.

When being used to join one extending member to another (FIG. 18) or various brackets to an extending member (FIG. 20), the lower face 99 of neck portion 85 rests on the end face 100 of an inner slot 37. In order to accomplish this the outer diameter of neck portion 85 must be slightly larger than the inner diameter of slot 37. The height of neck portion 85 is substantially equal to the thickness of the face openings 30. In this manner when, for example, an extending member 59 is joined to an extending member 31, the edge face 101 of member 59 butts with the end face 102 of member 31 leaving substantially no gap therebetween. This results not only in a very aesthetically appealing look, but also and importantly serves to provide a strong cantilevered joint between two extending members joined at right angles.

In FIG. 20, connector 80 is shown in use with various types of brackets or shelves being joined at right angles to an extending upright member 31. Bracket 95 may comprise a "waterfall" bracket having a hook member attached thereto. This type of bracket 95 is useful for hanging garments thereon or even belts or handbags. Shelf 95 may simple rest on a connector 80 wedgedly secured to each of parallel arranged coextending and spaced vertical uprights 31. Bracket 97 comprises a well-known type of bracket which is commonly used for shelves attached to a wall upright 31. In brackets 95 and 97 the shank end 87 of connectors 80 may be welded to the brackets or may be fitted within a hole similar to slot 37. The versatility of the connector 80 in conjunction with extending members having slots 37 and 30 therein and other extending members or brackets is obvious to those skilled in the art.

Figure 22:
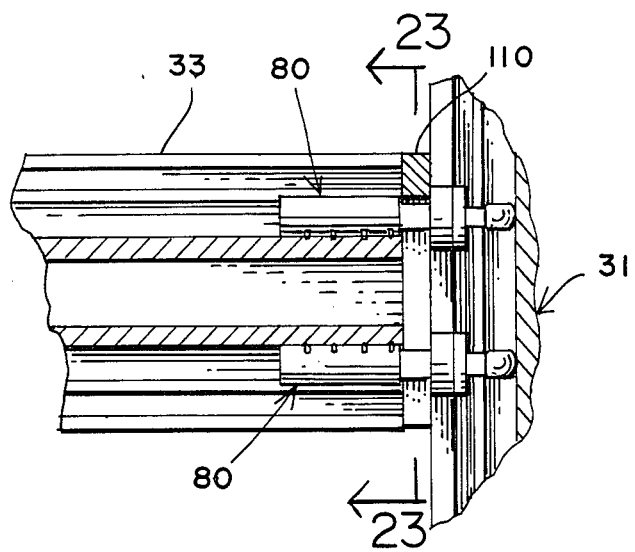
FIG. 22 is a partial side view of the connector of FIG. 15 and the extending member of FIG. 21 joined to another extending member.
Figure 24:
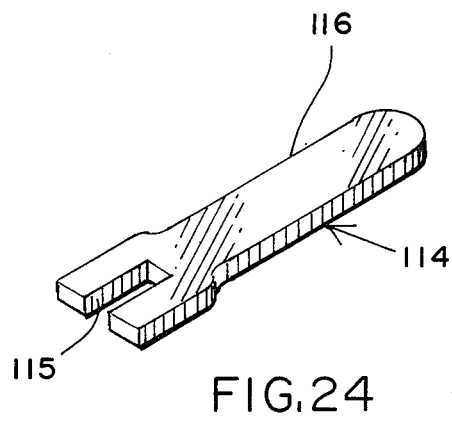
FIG. 24 is a perspective view of one type of tool which may be used to effectuate the connection of FIG. 22.
Figure 23:
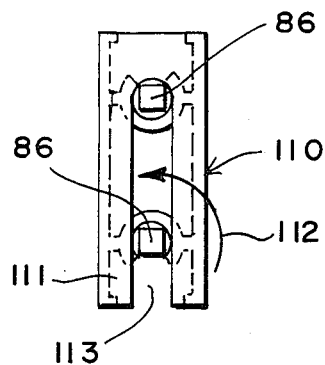
FIG. 23 is a cross-sectional view taken along the line 23—23 of FIG. 22.
Figure 21:
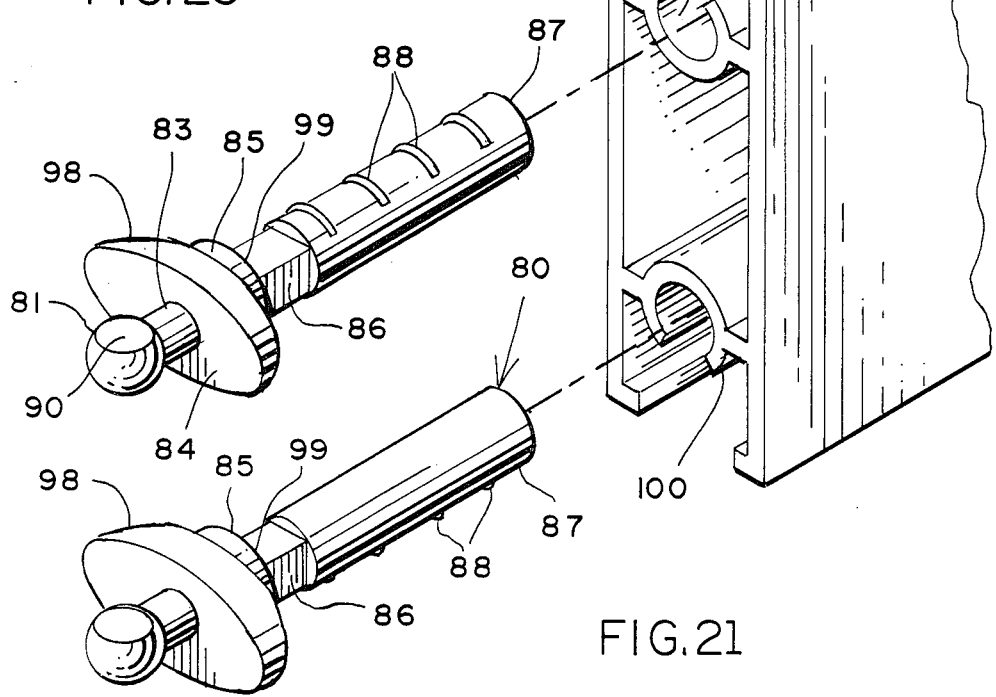
FIG. 21 is a prospective view of the connector of FIG. 15 being used with an extending member having two internal slots for use with two connectors.

FIGS. 22 through 24 illustrated the embodiment of the connector of FIG. 15 but as used in a double combination. This embodiment would be useful where a very strong joint is desired between right angled abutting extending members. An extending member 33 having two spaced internal slots 37 may be fitted with two connectors 80 in the manner above-described. However, connectors are not seated with faces 99 against 100. Instead, a filler or spacer piece 110 is slid over flats 86 of connectors 80 as shown in FIG. 23. The width of opening 113 in spacer piece 110 is smaller than the diameter of neck portion 85 and smaller than the outer diameter of face 100 of slots 37. Spacer 110 thereby separates faces 99 and 100 by the thickness of spacer 110. The width of opening 113 in spacer 110 is, however, larger than the across the corners dimension of flats 86 on connector 80.

A pair of connectors 80 are inserted into respective openings 37 of member 33 with spacer 110 therebetween. Each connector is rotated in turn such that the longitudinal axis of flange 84 are aligned along the same line and in line with the line joining the longitudinal centerlines of slots 37. This rotation causes the ridges 88 of connectors 80 to biteinto the inner circumference of slots 37 and thereby locks connectors 80 to member 33. Spacer 110 is now removed. Extending member 33 with connectors 80 attached thereto are then inserted through face slot 30 and into inner slots 37 of another extending member, such as member 31 or another member 33, positioned at a right angle to member 33. A wrench 114 having an opening 115 therethrough at the end thereof is in turn applied to the flats 86 of each connector and by turning handle 116 each connector is rotated into a wedged locking arrangement with face slot 30 and inner slot 37 as above-described. The space between abutting members 33 and, for example, members 31 or 33, is substantially equal to the thickness of spacer 110. By sliding a spacer 110 therebetween, a finished connection as shown in FIG. 22 is effectuated. Since the width of opening 113 is greater than the across-the-corner dimension of flats 86, the resulting orientation of flats 86 are immaterial to the insertion of spacer 110. The result is a strong cantilevered joint using two connectors.

While the invention has been described, disclosed, illustrated and shown in certain terms or certain embodiments or modifications which is has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim as my invention:

1. A connector arrangement for butt joining two extending members comprising, a first extending member having at least one inner opening therein and extending in a direction of the longitudinal axis of the first extending member, a second extending member having an inner opening and an inner slot through a wall thereof, both extending in a direction of the longitudinal axis of the second extending member, a face slot through a face wall of said second extending member and extending in a direction of the longitudinal axis of said second extending member, at least one connector member having a shank portion and a head portion, said head portion having a spherical portion and a plate portion spaced along the length thereof, said shank portion being lockingly fitted within said inner opening of said first extending member, said spherical head portion being fitted through said inner slot and lockingly fitted within said inner opening of said second extending member, and said plate portion being fitted through said face slot and being lockingly fitted to an interior surface of said face wall.

2. The connector arrangement of claim 1, wherein said spherical head portion of said connector has a flat surface on opposite sides thereof and said inner slot of said second extending member has a width slightly larger than the distance between the flat surfaces of said spherical head portion of the connector whereby rotation of said first extending member relative to said second extending member rotates said spherical head portion within said interior opening in the second extending member and locks the spherical portion of said connector against the interior surface of said inner opening of the second extending member.

3. The connector arrangement of claim 1, wherein said plate member in the plane of the plate has a width slightly smaller than the width of the slot in the face of said second extending member and a length dimension transverse to said width dimension slightly larger than the width of the face slot of said second extending member whereby rotation of said connector relative to said second extending member lengthwise locks the plate portion against the interior surface of the face wall of said second extending member.

4. The apparatus of claim 1, wherein said shank portion of said connector includes a plurality of aligned protrusions extending circumferentially around said shank, and spaced along the length thereof, the diameter of the shank being slightly less than the diameter of the inner opening in the first extending member and the effective diameter of the shank at the location of the protrusions being slightly greater than the diameter of the inner opening of the first extending member whereby rotation of the connector within said inner opening locks the shank of the connector within said inner opening.

5. The apparatus of claim 4, wherein the circumferential length of each of the aligned and spaced protrusions is less than the width of the slot of said inner opening.

6. The connector arrangement of claim 1 wherein said first extending member has two spaced inner parallel openings extending in the direction of the longitudinal axis of said first extending member, each inner opening having one connector member fitted therein with the head portion extending therefrom, a spacer member comprising a plate having a slot therethrough extending from an edge thereof in a longitudinal direction along said plate, said connectors each having a pair of flat surfaces provided on opposite sides of said shank, said spacer member fitting between the shank and the plate portions of said connectors at the location of said flat surfaces, each of said head portions of said connectors lockingly fitted within said inner opening and said interior surface of said face wall of said second extending member at spaced locations along the length of said second extending member.

* * * * *